(12) United States Patent
Pham et al.

(10) Patent No.: US 12,400,432 B2
(45) Date of Patent: Aug. 26, 2025

(54) MEMORY-OPTIMIZED CONTRASTIVE LEARNING

(71) Applicant: Google LLC, Mountain View, CA (US)

(72) Inventors: Hieu Hy Pham, Redwood City, CA (US); Zihang Dai, Pittsburgh, PA (US); Golnaz Ghiasi, Mountain View, CA (US); Hanxiao Liu, Santa Clara, CA (US); Wei Yu, Palo Alto, CA (US); Mingxing Tan, Newark, CA (US); Quoc V. Le, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 469 days.

(21) Appl. No.: 17/988,655

(22) Filed: Nov. 16, 2022

(65) Prior Publication Data

US 2023/0154161 A1    May 18, 2023

Related U.S. Application Data

(60) Provisional application No. 63/280,105, filed on Nov. 16, 2021.

(51) Int. Cl.
| | |
|---|---|
| *G06K 9/00* | (2022.01) |
| *G06F 40/126* | (2020.01) |
| *G06T 9/00* | (2006.01) |
| *G06V 10/764* | (2022.01) |
| *G06V 10/774* | (2022.01) |
| *G06V 10/776* | (2022.01) |
| *G06V 10/82* | (2022.01) |

(52) U.S. Cl.
CPC .......... *G06V 10/774* (2022.01); *G06F 40/126* (2020.01); *G06T 9/002* (2013.01); *G06V 10/764* (2022.01); *G06V 10/776* (2022.01); *G06V 10/82* (2022.01)

(58) Field of Classification Search
CPC .... G06V 10/774; G06V 10/776; G06V 10/82; G06V 10/764; G06N 3/088; G06N 3/0895; G06N 3/0455; G06N 3/084; G06N 3/0442; G06N 3/045; G06F 40/126; G06T 9/002; G06T 11/60
See application file for complete search history.

(56) References Cited

U.S. PATENT DOCUMENTS

| | | | | |
|---|---|---|---|---|
| 11,948,083 | B2 * | 4/2024 | Dalli | G06N 3/047 |
| 2024/0403625 | A1 * | 12/2024 | Vogler | G06N 3/0455 |

OTHER PUBLICATIONS

Radford, A., Kim, J. W., Hallacy, C., Ramesh, A., Goh, G., Agarwal, S., . . . & Sutskever, I. (Jul. 2021). Learning transferable visual models from natural language supervision. In International conference on machine learning (pp. 8748-8763). PmLR. (Year: 2021).*
Nawaz, S., Janjua, M. K., Calefati, A., & Gallo, I. (2018). Revisiting cross modal retrieval. arXiv preprint arXiv:1807.07364. (Year: 2018).*

(Continued)

*Primary Examiner* — Gregory A Morse
*Assistant Examiner* — Kevin M Coomber
(74) *Attorney, Agent, or Firm* — Fish & Richardson P.C.

(57) ABSTRACT

Methods, systems, and apparatus, including computer programs encoded on computer storage media, for using memory-optimized contrastive learning to train image encoder and text encoder neural networks.

20 Claims, 5 Drawing Sheets

(56) References Cited

OTHER PUBLICATIONS

Abadi et al., "Tensorflow: A system for large-scale machine learning," Proceedings of the 12th USENIX Symposium on Operating Systems Design and Implementation (OSDI '16), Nov. 2-4, 2016, Savannah, GA, USA, 21 pages.

Akata et al., "Evaluation of output embeddings for fine-grained image classification," 2015 IEEE Conference on Computer Vision and Pattern Recognition (CVPR), Boston, MA, USA, Jun. 7-12, 2015, 10 pages.

Akata et al., "Label-embedding for image classification," Transactions on Pattern Analysis and Machine Intelligence, Sep. 2015, 38(7):1425-1438, 15 pages.

Barbu et al., "Objectnet: A large-scale bias-controlled dataset for pushing the limits of object recognition models," In Proceedings of 33rd Conference on Neural Information Processing Systems (NeurIPS 2019), Vancouver BC, Canada, Dec. 8-14, 2019, 11 pages.

Bello et al., "Revisiting resnets: Improved training and scaling strategies," In Proceedings of 35th Conference on Neural Information Processing Systems (NeurIPS 2021), online, Dec. 6-14, 2021, 14 pages.

Berg et al., "Birdsnap: Large-scale fine-grained visual categorization of birds," In Proceedings of IEEE Conference on Computer Vision and Pattern Recognition 2014, Columbus, Ohio, USA, Jun. 24-27, 2014, 8 pages.

Bossard et al., "Food-101-mining discriminative components with random forests," European Conference on Computer Vision, Zurich, Switzerland, Sep. 6-12, 2014, 8694:446-461.

Chen et al., "A simple framework for contrastive learning of visual representations," In Proceedings of the 37th International Conference on Machine Learning, Vienna, Austria, Jul. 13-18, 2020, 119:1597-1607, 11 pages.

Chen et al., "Big self-supervised models are strong semi-supervised learners," In Proceedings of 35th Conference on Neural Information Processing Systems (NeurIPS 2020), online, Dec. 6-12, 2020, 22243-22255, 13 pages.

Chen et al., "Improved baselines with momentum contrastive learning, " CoRR, submitted on Mar. 2020, arXiv:2003.04297v1, 3 pages.

Chen et al., "Learning the best pooling strategy for visual semantic embedding," 2021 IEEE/CVF Conference on Computer Vision and Pattern Recognition (CVPR), Nashville, TN, USA, Jun. 19-25, 2021, 15784-15793, 10 pages.

Chen et al., "Training deep nets with sublinear memory cost," CoRR, submitted on Apr. 2016, arxiv:1604.06174v2, 12 pages.

Chen et al., "Uniter: Universal image-text representation learning," CoRR, submitted on Jul. 2020 arXiv:1909.11740v3, 26 pages.

Cheng et al., "Remote sensing image scene classification: Benchmark and state of the art," Proceedings of the IEEE, Apr. 2017, 105(10):1865-1883, 17 pages.

Cimpoi et al., "Describing textures in the wild," In Proceedings of IEEE Conference on Computer Vision and Pattern Recognition 2014, Columbus, Ohio, USA, Jun. 24-27, 2014, 8 pages.

Coates et al., "An Analysis of Single Layer Networks in Unsupervised Feature Learning," In Proceedings of the 14th International Conference on Artificial Intelligence and Statistics (AIStats), Ft. Lauderdale, FL, USA, Apr. 11-13, 2011, 9 pages.

Dai et al., "Coatnet: Marrying convolution and attention for all data sizes," In Proceedings of 35th Conference on Neural Information Processing Systems (NeurIPS 2021), online, Dec. 6-14, 2021, 13 pages.

Desai et al., "Virtex: Learning visual representations from textual annotations," In Proceedings of 35th Conference on Neural Information Processing Systems (NeurIPS 2021), online, Dec. 6-14, 2021, 11162-11173, 12 pages.

Devlin et al., "Bert: Pre-training of deep bidirectional transformers for language understanding," In Proceedings of NAACL-HLT 2019, Minneapolis, MN, USA, Jun. 2-7, 2019, 4171-4186, 16 pages.

Dosovitskiy et al., "An image is worth 16×16 words: Transformers for image recognition at scale," In Proceedings of the International Conference on Learning Representations (ICLR 2021), Vienna, Austria, May 4-7, 2021, 21 pages.

Everingham et al., "The PASCAL Visual Object Classes Challenge," Int. J. Comput. Vis. 88, Sep. 2009, 36 pages.

Faghri et al., "Vse++: Improving visual-semantic embeddings with hard negatives," CoRR, submitted on Jul. 2017, arXiv:1707.05612v1, 9 pages.

Fei-Fei et al., "Learning generative visual models from few training examples: An incremental bayesian approach tested on 101 object categories," In Proceedings of IEEE Conference on Computer Vision and Pattern Recognition 2004, Washington D.C., USA, Jun. 27-Jul. 2, 2004, 9 pages.

Frome et al., "Devise: A deep visual-semantic embedding model," Advances in Neural Information Processing Systems 26, 2013, 9 pages.

Goyal et al., "Accurate, large minibatch SGD: training imagenet in 1 hour," CoRR, submitted on Apr. 2018, arxiv:1706.02677v2, 12 pages.

Griewank et al., "Algorithm 799: revolve: an implementation of checkpointing for the reverse or adjoint mode of computational differentiation," ACM Transactions on Mathematical Software (TOMS), Mar. 2000, 26(1):19-45, 27 pages.

He et al., "Deep residual learning for image recognition," In Proceedings of IEEE Conference on Computer Vision and Pattern Recognition 2015, Boston, MA, USA, Jun. 7-12, 2015, 9 pages.

He et al., "Momentum contrast for unsupervised visual representation learning," In Proceedings of IEEE Conference on Computer Vision and Pattern Recognition 2020, online, Jun. 14-19, 2020, 10 pages.

Helber et al., "Introducing EuroSAT: A novel dataset and deep learning benchmark for land use and land cover classification," In Proceedings of the IEEE International Geoscience and Remote Sensing Symposium (IGARSS 2018), Valencia, Spain, Jul. 22-27, 2018, 204-207, 4 pages.

Hendrycks et al., "Natural adversarial examples," In Proceedings of IEEE Conference on Computer Vision and Pattern Recognition 2021, online, Jun. 19-25, 2021, 16 pages.

Hendrycks et al., "The many faces of robustness: A critical analysis of out-of-distribution generalization," In Proceedings of 2021 IEEE/CVF International Conference on Computer Vision (ICCV), Montreal, QC, Canada, Oct. 10-17, 2021, 8320-8329, 10 pages.

Hinton et al., "Lecture 6e RmsProp: Divide the gradient by a running average of its recent magnitude" Dec. 8, 2016, retrieved on Dec. 2, 2023, retrieved from URL <https://www.youtube.com/watch?v=SJ48OZ_qlrc>, 1 page.

Hodosh et al., "Framing image description as a ranking task: Data, models and evaluation metrics," Journal of Artificial Intelligence Research, May 2013, 47(1):853-899.

Huang et al, "Gpipe: Efficient training of giant neural networks using pipeline parallelism," In Proceedings of 33rd Conference on Neural Information Processing Systems (NeurIPS 2019), Vancouver BC, Canada, Dec. 8-14, 2019, 10 pages.

Huang et al., "Deep networks with stochastic depth," In European Conference on Computer Vision (ECCV 2016) Lecture Notes in Computer Science, Sep. 2016, 9908:646-661, 16 pages.

Huang et al., "Pixel-bert: Aligning image pixels with text by deep multi-modal transformers," CoRR, submitted on Jun. 2020, arxiv:2004.00849v2, 17 pages.

International Search Report and Written Opinion in International Appln. No. PCT/US2022/050143, mailed on Apr. 3, 2023, 14 pages.

Jia et al., "Scaling up visual and vision-language representation learning with noisy text supervision," In Proceedings of the 38th International Conference on Machine Learning (ICML 2021), 13 pages.

Joulin et al., "Learning visual features from large weakly supervised data," CoRR, submitted Nov. 2015, arXiv:1511.02251v1, 11 pages.

Jouppi, "In-datacenter performance analysis of a tensor processing unit," CoRR, submitted on Apr. 2017, arXiv:1704.04760, 17 pages.

(56) References Cited

OTHER PUBLICATIONS

Karpathy et al., "Deep visual-semantic alignments for generating image descriptions," In Proceedings of IEEE Conference on Computer Vision and Pattern Recognition 2015, Boston, MA, USA, Jun. 7-12, 2015, 17 pages.
Kingma et al., "Adam: A method for stochastic optimization" CoRR, Submitted on Jan. 2017, arXiv:1412.6980v9, 15 pages.
Kiros et al., "Unifying visual-semantic embeddings with multimodal neural language models," CoRR, submitted on Nov. 2014, arxiv:1411.2539, 13 pages.
Kolesnikov et al., "Big transfer (bit): General visual representation learning," In ECCV, 2020, 17 pages.
Krizhevsky, "Learning multiple layers of features from tiny images," Technical Report TR-2009, University of Toronto, Toronto, Apr. 2009, 60 pages.
Kudo et al., "Sentencepiece: A simple and language independent subword tokenizer and detokenizer for neural text processing," In EMNLP, Oct. 2018, 66-71.
Larochelle et al., "Zerodata learning of new tasks," In AAAI, 2008, 646-651.
LeCun et al., "Mnist handwritten digit database," ATT Labs, 2010, 8 pages.
Lepikhin et al., "Gshard: Scaling giant models with conditional computation and automatic sharding," CoRR, submitted on Jun. 2020, arxiv:2006.16668v1, 35 pages.
Lester et al., "The power of scale for parameter-efficient prompt tuning," In EMNLP, Nov. 2021, 3045-3059.
Li et al., "Learning visual n-grams from web data," In ICCV, 2017, 4183-4192.
Li et al., "Visual semantic reasoning for image-text matching," In ICCV, 2019, 4654-4662.
Liu et al., "Aligning visual regions and textual concepts for semantic-grounded image representations," CoRR, submitted on Nov. 2019, arxiv:1905.06139v3, 15 pages.
Loshchilov et al., "Decoupled weight decay regularization" CoRR, Submitted on Jan. 2019, arXiv:1711.05101v3, 19 pages.
Lu et al., "Vilbert: Pretraining task-agnostic visiolinguistic representations for vision- and-language tasks," In Proceedings of 33rd Conference on Neural Information Processing Systems (NeurIPS 2019), Vancouver BC, Canada, Dec. 8-14, 2019, 11 pages.
Mahajan et al., "Exploring the limits of weakly supervised pretraining," In ECCV, 2018, 16 pages.
Medium.com [online], "Training Neural Nets on Larger Batches: Practical Tips for 1-GPU, Multi-GPU & Distributed setups" Oct. 15, 2018, retrieved on Dec. 2, 2023, retrieved from URL <https://medium.com/huggingface/training-larger-batches-practical-tips-on-1-gpu-multi-gpu-distributed-setups-ec88c3e51255>, 23 pages.
Messina et al., "Fine-grained visual textual alignment for cross-modal retrieval using transformer encoders," ACM Transactions on Multimedia Computing, Communications, and Applications, 2020, 23 pages.
Mori et al., "Image-to-word transformation based on dividing and vector quantizing images with words," In Citeseer, 1999, 9 pages.
Nam et al., "Dual attention networks for multimodal reasoning and matching," In Proceedings of IEEE Conference on Computer Vision and Pattern Recognition 2017, Honolulu, HI, USA, Jul. 21-26, 2017, 9 pages.
Nesterov, "A method for solving the convex programming problem with convergence rate o(1=k2)," Soviet Mathematics Doklady, 1983, 372-376.
Nilsback et al., "Automated flower classification over a large number of classes," In Indian Conference on Computer Vision, Graphics and Image Processing, 2008, 8 pages.
Norouzi et al., "Zero-shot learning by convex combination of semantic embeddings," CoRR, submitted on Mar. 2014, arxiv:1312.5650v3, 9 pages.
Ott et al., "Scaling neural machine translation," In Workshop in Neural Machine Translation, Oct. 2018, 9 pages.

Parkhi et al., "Cats and dogs" In Proceedings of IEEE Conference on Computer Vision and Pattern Recognition 2012, Providence, RI, USA, Jun. 16-21, 2012, 8 pages.
Pham et al., "Combined Scaling for Zero-shot Transfer Learning," CoRR, submitted on Nov. 2021, arXiv:2111.10050v1, 18 pages.
Pham et al., "Meta pseudo labels," In Proceedings of IEEE Conference on Computer Vision and Pattern Recognition 2021, online, Jun. 19-25, 2021, 12 pages.
Radford et al., "Learning transferable visual models from natural language supervision," In Proceedings of the 38th International Conference on Machine Learning, online, Jul. 18-24, 2021, 139:8748-8763, 16 pages.
Recht et al., "Do imagenet classifiers generalize to imagenet?" In Proceedings of the 38th International Conference on Machine Learning, Long Beach, CA, USA, Jun. 9-15, 2019, 97:5389-5400, 12 pages.
Russakovsky et al., "ImageNet Large Scale Visual Recognition Challenge," IJCV, 2009, 211-252.
Sariyildiz et al., "Learning visual representations with caption annotations," In ECCV, 2020, 11 pages.
Schönfeld, et al., "Generalized zero- and few-shot learning via aligned variational autoencoders," In Proceedings of the 38th International Conference on Machine Learning, Long Beach, CA, USA, Jun. 9-15, 2019, 97:8239-8247.
Shazeer et al., "Adafactor: Adaptive learning rates with sublinear memory cost," CoRR, submitted Apr. 2018, arxiv:1804.04235v1, 9 pages.
Shazeer et al., "Mesh-tensorflow: Deep learning for supercomputers," CoRR, submitted on Nov. 2018, arxiv:1811.02084v1, 16 pages.
Socher et al., "Connecting modalities: Semi-supervised segmentation and annotation of images using unaligned text corpora," In Proceedings of the 2010 Conference on Computer Vision and Pattern Recognition (CVPR), San Francisco, CA, USA, Jun. 13-18, 2010, 8 pages.
Socher et al., "Grounded compositional semantics for finding and describing images with sentences," TACL, 2014, 12 pages.
Socher et al., "Zero-shot learning through cross-modal transfer," In Advances in Neural Information Processing Systems, 2013, 10 pages.
Sohoni et al, "Low-Memory Neural Network Training: A Technical Report" CoRR, Submitted on Apr. 2022, arXiv:1904.10631v2, 38 pages.
Soomro et al., "UCF101: A dataset of 101 human actions classes from videos in the wild," CoRR, submitted on Dec. 2012, arxiv:1212.0402v1, 7 pages.
Srivastava et al., "Dropout: a simple way to prevent neural networks from overfitting," The Journal of Machine Learning Research, Jun. 2014, 15(1):1929-1958, 30 pages.
Sun et al., "Revisiting unreasonable effectiveness of data in deep learning era," In ICCV, 2017, 843-852.
Szegedy et al., "Intriguing properties of neural networks," CoRR, submitted on Feb. 2014, arxiv:1312.6199v4, 10 pages.
Tan et al., "Efficientnetv2: Smaller models and faster training," In ICML, 2021, 11 pages.
Tan et al., "Efficientdet: Scalable and efficient object detection," n Proceedings of IEEE Conference on Computer Vision and Pattern Recognition 2020, online, Jun. 14-19, 2020, 10781-10790.
Tan et al., "Efficientnet: Rethinking model scaling for convolutional neural networks" CoRR, Submitted on May 2019, arXiv:1905.11946v1, 10 pages.
Taori et al., "Measuring robustness to natural distribution shifts in image classification," In Proceedings of the 34th Conference on Neural Information Processing Systems (NeurIPS 2020), online, Dec. 6-12, 2020, 17 pages.
Tian et al., "What makes for good views for contrastive learning?" In Proceedings of the 34th Conference on Neural Information Processing Systems (NeurIPS 2020), online, Dec. 6-12, 2020, 13 pages.
Touvron et al., "Fixing the train-test resolution discrepancy," In Proceedings of 33rd Conference on Neural Information Processing Systems (NeurIPS 2019), Vancouver BC, Canada, Dec. 8-14, 2019, 11 pages.

(56) References Cited

OTHER PUBLICATIONS

Van den Oord et al., "Representation learning with contrastive predictive coding," CoRR, submitted on Jan. 2019, arxiv:1807.03748v2, 13 pages.
Vaswani et al., "Attention is all you need," Advances in Neural Information Processing Systems, 2017, 5998-6008, 11 pages.
Veeling et al., "Rotation equivariant CNNs for digital pathology" CoRR, Submitted on Jun. 2018, arXiv:1806.03962v1, 8 pages.
Vinyals et al., "Show and tell: A neural image caption generator," 2015 IEEE Conference on Computer Vision and Pattern Recognition (CVPR), Boston, MA, USA, Jun. 7-12, 2015, 9 pages.
Wang et al., "Image quality assessment: from error visibility to structural similarity," IEEE transactions on image processing 13(4), Apr. 2004, 14 pages.
Wang et al., "Learning robust global representations by penalizing local predictive power," In Proceedings of 33rd Conference on Neural Information Processing Systems (NeurIPS 2019), Vancouver BC, Canada, Dec. 8-14, 2019, 13 pages.
Weston et al., "Large scale image annotation: learning to rank with joint wordimage embeddings," Machine Learning, Jul. 2010, 81:21-35, 15 pages.
Xian et al., "Latent embeddings for zero-shot classification," In Proceedings of IEEE Conference on Computer Vision and Pattern Recognition 2016, Las Vegas, NV, USA, Jun. 26-Jul. 1, 2016, 9 pages.
Xian et al., "Zero-shot learning—the good, the bad and the ugly," In Proceedings of IEEE Conference on Computer Vision and Pattern Recognition 2017, Honolulu, HI, USA, Jul. 21-26, 2017, 10 pages.
Xiao et al. "SUN database: Large-scale scene recognition from abbey to zoo," In Proceedings of the 2010 Conference on Computer Vision and Pattern Recognition (CVPR), San Francisco, CA, USA, Jun. 13-18, 2010, 8 pages.
Xie et al., "Self-training with noisy student improves imagenet classification," In Proceedings of IEEE Conference on Computer Vision and Pattern Recognition 2020, online, Jun. 14-19, 2020, 10687-10698.
Xu et al., "Show, attend and tell: Neural image caption generation with visual attention," In Proceedings of the 32 nd International Conference on Machine Learning, Lille, France, Jul. 6-11, 2015, 37, 10 pages.
Yuan et al., "Volo: Vision outlooker for visual recognition," CoRR, submitted on Jun. 2021, arXiv:2106.13112v2, 12 pages.
Zhai et al., "Scaling vision transformers," CoRR, submitted on Jun. 2022, arxiv:2106.04560v2, 31 pages.
Zhang et al., "Contrastive learning of medical visual representations from paired images and text," CoRR, submitted on Sep. 2022, arxiv:2010.00747v2, 24 pages.
Zhang et al., "Learning a deep embedding model for zero-shot learning," In Proceedings of IEEE Conference on Computer Vision and Pattern Recognition 2017, Honolulu, HI, USA, Jul. 21-26, 2017, 10 pages.
International Preliminary Report on Patentability in International Appln. No. PCT/US2022/050143, mailed on May 2, 2024, 12 pages.

* cited by examiner

MEMORY-OPTIMIZED CONTRASTIVE LEARNING

CROSS-REFERENCE TO RELATED APPLICATION

This application claims priority to U.S. Provisional Application No. 63/280,105, filed on Nov. 16, 2021. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains an image encoder neural network and a text encoder neural network. In particular, as part of the training, the system trains the image encoder, the text encoder, or both through contrastive learning.

More specifically, this specification describes how the system modifies contrastive learning training to allow large models to be trained with large batch sizes without being bottlenecked by the limited memory of the device(s) on which the system performs the training. For example, the system can perform the training on a set of one or more accelerator devices, e.g., deep learning accelerators like Graphics Processing Units (GPUs) or Tensor Processing Units (TPUs). While these devices are advantageous for model training because they have dedicated hardware for performing common training operations in hardware, e.g., matrix multiplication circuitry for performing matrix multiplies in hardware, they have limited on-chip memory, thereby resulting in a memory bottleneck when large multimodal models are trained through contrastive learning. This specification performs the contrastive learning in a way that overcomes this bottleneck.

Particular embodiments of the subject matter described in this specification can be implemented so as to realize one or more of the following advantages.

Contrastive learning techniques can be used to learn representations, e.g., of images, text, or both, that yield significant improvements when the representations are used for downstream tasks, e.g., image classification, image captioning, text-to-image search, and so on.

Additionally, increasing the batch size that is used during training can improve the quality of the representations because each embedding for each input in the batch can be "contrasted" with a more diverse set of candidates, e.g., embeddings for other inputs in the same batch. In particular, larger batch sizes allow for more negative examples to be used in the contrastive learning objective, improving the quality of the representations generated by the encoder neural network, e.g. resulting in an encoder neural network that produces encodings that cluster similar inputs more closely while clearly separating dissimilar inputs.

However, the training of these neural networks is generally performed on one or more computing devices, e.g., central processing units (CPUs) or deep learning accelerators like graphics processing units (GPUs), tensor processing units (TPUs), other ASICs, or FPGAs, that have limited on-device memory. Thus, increasing the batch size can be infeasible because it would require more memory to perform the forward pass for each input in the larger batch than is available on the devices on which the training is being performed. To address this issue, this specification describes techniques for performing contrastive learning with batch sizes that would otherwise exceed this memory limit. That is, for a given batch size that would otherwise exceed this memory limit, the described techniques decrease the memory footprint of training on batches having the batch size so that the footprint never exceeds the available memory on the one or more devices. Training using the described techniques results in improved representations, i.e., representations that perform better on downstream tasks, e.g., zero shot or few shot image classification.

Moreover, increasing the size, i.e., the number of parameters, of the encoder neural network(s) has also been shown to improve the performance of contrastive learning. However, naively increasing the size of the neural network requires storing a large gradient vector, i.e., a gradient vector that includes a respective entry for each of the parameters, in the on-device memory, further bottlenecking the training, especially when combined with large batch sizes. This specification describes techniques for updating the parameters of the encoder neural network without needing to store an entire gradient vector in memory, removing this bottleneck and freeing up more of the on-device memory to, e.g., further increase the model size or the batch size.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes systems implemented as computer programs on one or more computers in one or more locations that trains an image encoder neural network and a text encoder neural network.

Figure 1:
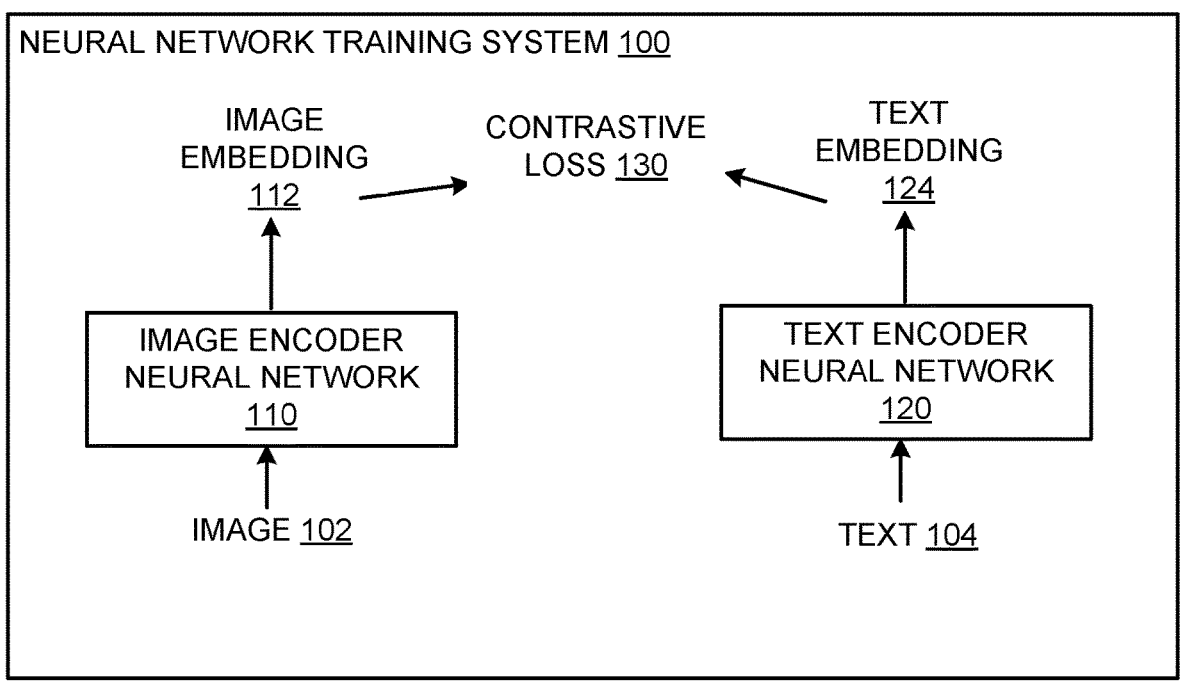
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

This system 100 trains an image encoder neural network 110 and a text encoder neural network 120.

The image encoder neural network 110 is a neural network that has parameters ("image encoder neural network parameters" or "image encoder parameters") and receives an input image 102 and processes the input image 102 in accordance with the parameters to generate an image embedding 112 of the input image in an embedding space. An "embedding" as used in this specification is a vector of numeric values, e.g., floating point values or other values, having a pre-determined dimensionality. The space of possible vectors having the pre-determined dimensionality is referred to as the "embedding space."

The image encoder neural network 110 can have any appropriate architecture that allows the neural network 110 to map an input image to a vector from the embedding space. For example, the image encoder neural network 110 can be a convolutional neural network. As another example, the image encoder neural network 110 can be a vision Transformer neural network that has one or more self-attention layers. As yet another example, the image encoder neural network 110 can be a neural network that has a mix of both convolutional and self-attention layers.

The text encoder neural network 120 is a neural network that has parameters ("text encoder neural network parameters" or "text encoder parameters") and receives an input text segment 104 and processes the input text segment 104 in accordance with the parameters to generate a text embedding 124 of the input segment 104 in the same embedding space, i.e., the image embeddings 112 and text embeddings 124 have the same dimensionality. The text segments 104 can be single words, sentences, or other multi-word phrases.

The text encoder neural network 120 can have any appropriate architecture that allows the neural network 120 to map an input text segment to a vector from the embedding space. For example, the text encoder neural network 120 can be an encoder-only Transformer neural network. As another example, the text encoder neural network 120 can be a recurrent neural network, e.g., a long short-term memory (LSTM) neural network or a gated recurrent unit (GRU) neural network.

After being trained, the image encoder 110, the text encoder 120, or both can be used for one or more downstream tasks.

An example of a downstream task is image classification, where the input is an image and the output is a classification output that identifies, from a set of object classes, one or more object classes that are predicted to be depicted in the image.

As a particular example, the neural networks 110 and 120 can be used for zero-shot image classification. To perform zero-shot image classification, the system (or a different inference system) processes, for each object class in the set, a text segment characterizing the object class using the trained text encoder to generate a respective text embedding for each object class.

The system then processes the input image using the image encoder to generate an image embedding of the input image and selects, as the one or more classes that are identified in the classification output, the object classes having text embeddings that are closest in the embedding space to the image embedding.

Another example of a downstream task is image search, where the input is text and the output is one or more images that relevant to the input text, i.e., have similar semantic content to the input text.

To perform an image search, the system (or a different inference system) processes the input using the text encoder to generate a text embedding for the input text. The system then identifies one or image embeddings that have been generated using the trained image encoder that are closest to the text embedding and provides data identifying the images from which the one or more closest image embeddings were generated in response to the input text.

The system 100 trains the neural networks 110 and 120 on a set of one or more computing devices, e.g., one or more CPUs, GPUs, TPUs, or other ASICs, or FPGAs. Generally, as described above, the set of one or more computing devices has limited on-device or on-chip memory.

For at least part of the training, the system 100 uses contrastive learning. The goal of contrastive learning is to train the image encoder 110 and the text encoder 120 so that they can embed image and text inputs into the embedding space in such a way that inputs with similar semantics are mapped to nearby points regardless of their modalities.

To this end, in each training step during contrastive learning, the neural networks 110 and 120 receive a mini-batch of N pairs ($x_i$; $y_i$), where $x_i$ is an image and $y_i$ is a text sequence (e.g., a textual description) with similar semantic contents to $x_i$. Each image $x_i$ and text sequence $y_i$ is then mapped into respective embeddings, i.e., into respective points in the embedding space, by the corresponding neural network 110 or 120.

The system can then train the neural network 110, the neural network 120, or both using a contrastive loss 130 that encourages, for all pairs in the minibatch, the embeddings of $x_i$ and $y_i$ to be closer together while being farther from all other embeddings of all other images and text segments in the minibatch.

A particular example of a contrastive loss 130 will be described next.

Based on the embeddings for the images and the text segments in the pairs in the mini-batch, an N×N similarity matrix A is computed, where $A_{i,j}$ is a value that represents how similar the image embedding of $x_i$ is to the text embedding of $y_j$. For example, $A_{i,j}$ can be the dot product between the image embedding of $x_i$ and the text embedding of $y_j$ similar are the embeddings of image xi and text sequence yi.

The system 100 can then train the neural network 110, the neural network 120, or both using gradients of a contrastive loss computed using the matrix A. For example, the contrastive loss can be the cross-entropy loss on the rows and columns of A, where the diagonal entries are treated as correct classes while other entries are treated as incorrect classes. A specific example of such a loss is:

$$L_c = -\frac{1}{2N}\left(\sum_{i=1}^{N} \log\left(\frac{e^{\frac{A_{i,i}}{\tau}}}{\sum_j e^{\frac{A_{i,j}}{\tau}}}\right) + \sum_{j=1}^{N} \log\left(\frac{e^{\frac{A_{j,j}}{\tau}}}{\sum_k e^{\frac{A_{k,j}}{\tau}}}\right)\right),$$

where $\tau$ is the softmax temperature which serves to steepen or dampen the softmax distributions in the rows and columns of A.

As this loss is minimized, for all pairs in the minibatch, the embeddings of $x_i$ and $y_i$ become closer together while becoming farther from all other embeddings of all other images and text segments in the minibatch, thereby achieving the goal of the contrastive learning.

As can be seen from the above loss, the contrastive loss for any given pair in a minibatch depends not only the embeddings for the given pair, but the embeddings for all other pairs in the minibatch.

In order to improve the training of the neural networks 110 or 120, i.e., so that the trained neural networks 110 and 120 generate higher-quality, more accurate embeddings, it is generally desirable to increase the mini-batch size, to increase the size, i.e., the number of parameters of, the neural networks 110 and 120, or both. However, this creates a memory bottleneck due to the limited on-chip memory of the set of computing devices used for the training. While techniques for circumventing this bottleneck exist for other types of learning, they are generally inapplicable to contrastive learning due to the inter-dependency among every pair of examples when computing the contrastive loss.

By contrast to conventional approaches, when performing contrastive learning, the system 100 makes use of one or more techniques that are tailored to contrastive learning and allow the system to effectively use a contrastive loss even when training large models with large batch sizes on devices/systems with limited on-device memory.

Using contrastive learning to train the image encoder 110, the text encoder 120, or both is described below with reference to FIGS. 2-5.

The system 100 can incorporate contrastive learning into the training of the neural networks 110 and 120 in any of a variety of ways.

As one particular example, the system 100 can train both the neural networks 110 and 120 jointly and from scratch using contrastive learning.

As another particular example, the system 100 can first pre-train the image encoder 110 on a labeled image data set as part of a classification model using a softmax classification loss or other appropriate image classification loss. The system 100 can then perform a first contrastive learning phase to train only the text encoder 120 while keeping the image encoder 110 fixed.

Optionally, the system 100 can then perform a "fine-tuning" contrastive learning phase to train both neural networks 110 and 120 using contrastive learning. Performing this fine-tuning allows the neural network 110 to learn from noisy image-text data, improving the performance of the neural networks 110 and 120 on some downstream tasks relative to only pre-training the image encoder on the labeled image data set.

Figure 2:
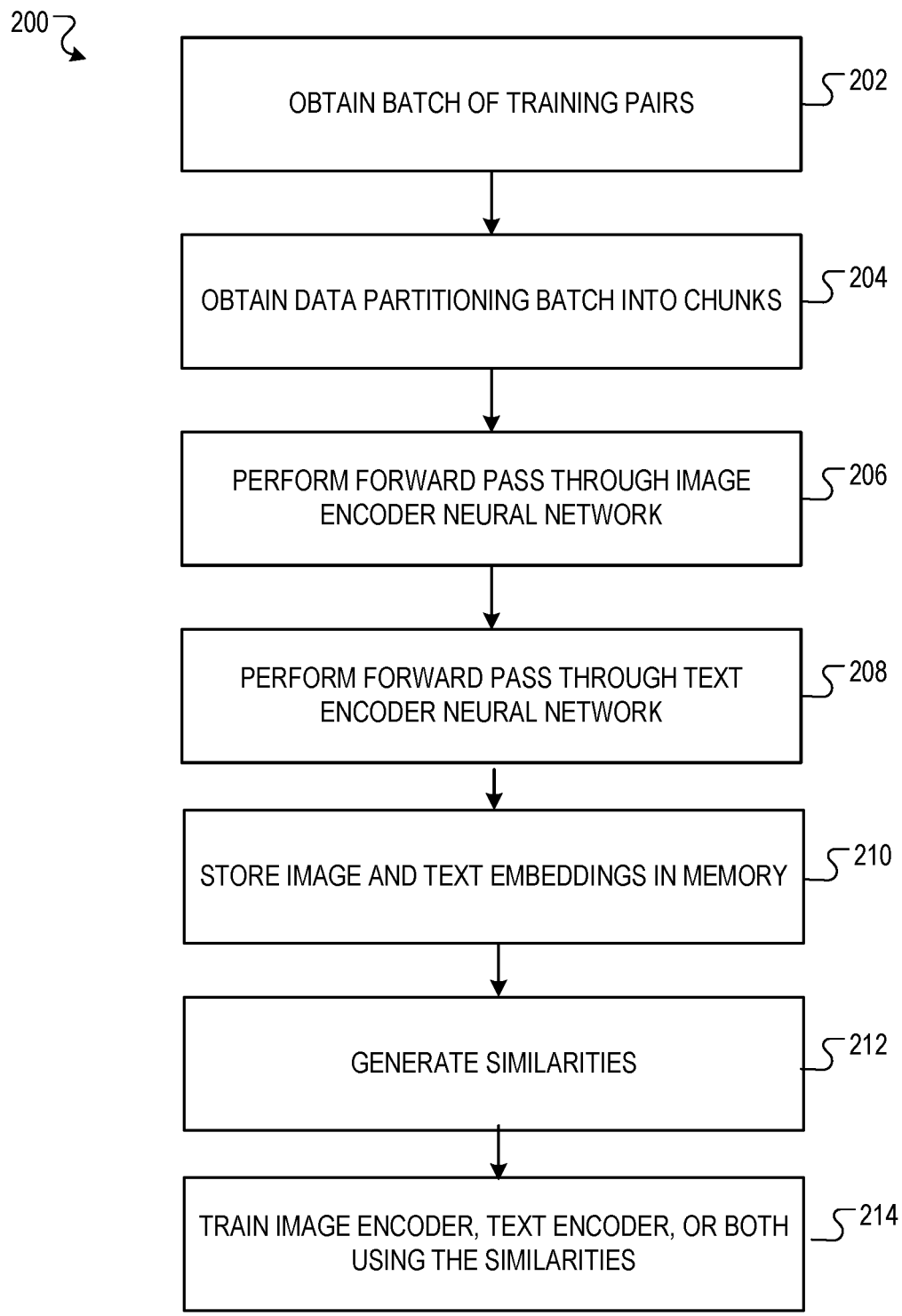
FIG. 2 is a flow diagram of an example process for training the neural network.

FIG. 2 is a flow diagram of an example process 200 for training using contrastive learning. For convenience, the process 200 will be described as being performed by a system of one or more computers located in one or more locations. For example, a neural network system, e.g., the neural network system 100 of FIG. 1, appropriately programmed, can perform the process 200.

The system can repeatedly perform iterations of the process 200 on different batches of training examples to update the parameters of the image encoder neural network, the text encoder neural network, or both.

That is, at each iteration of the process 200, the system obtains a batch of training pairs, e.g., by sampling the batch from a larger set of training data, and uses the batch of one or more training examples to update the parameters of the image encoder neural network, the text encoder neural network, or both.

The system can continue performing iterations of the process 200 until termination criteria for the training of the neural network have been satisfied, e.g., until the parameters have converged, until a threshold amount of wall clock time has elapsed, or until a threshold number of iterations of the process 200 have been performed.

The system obtains a batch of training pairs (step 202). Each training pair including an input image and an input text segment. In particular, the input text segment has been determined by the system or an external source to describe the contents of the input image or otherwise be relevant to the input image. In other words, the input image and the input text segment have been determined to be semantically similar.

The system obtains data partitioning the batch of training pairs into a plurality of chunks of training pairs (step 204). For example, the system or another system can randomly partition the training pairs in the batch into fixed sized chunks, such that the one or more computing devices, e.g., one or more CPUs, GPUs, TPUs, or other ASICs, or FPGAs, have sufficient available memory to perform a forward pass through both neural networks on the training pairs in each chunk. Performing a "forward pass" refers to performing the operations required to generate respective embeddings for each input in a set of inputs.

In some cases, for large batch sizes, the amount of memory required to perform a forward pass on the batch of training input pairs exceeds the amount of available memory in the memory of the set of one or more computing devices, but, by dividing the batch into chunks, the amount of memory required to perform the first forward pass for each chunk does not exceed the amount of available memory.

The system then performs steps 206-210 for each of the chunks.

The system performs, on the set of one or more computing devices, a first forward pass through the image encoder neural network in accordance with current values of the image encoder neural network parameters on the input images in the training pairs in the chunk to generate a respective image embedding of each input image (step 206).

The system performs, on the set of one or more computing devices, a first forward pass through the text encoder neural network in accordance with current values of the text encoder neural network parameters on the input text segments in the training pairs in the chunk to generate a respective text embedding of each text segment (step 208).

As will be described in more detail below, when there are multiple devices in the set, each device can perform the respective forward passes for a partition of the pairs in each chunk.

The system then stores, in memory of the set of one or more computing devices, the respective image embeddings and the respective text embeddings (step 210). In particular, the system stores the image embedding and the text embeddings without storing the intermediate hidden states, e.g., activations and intermediate outputs generated by the hidden layers of the neural networks, generated by performing the first forward passes through the image encoder neural network and the text encoder neural network.

For example, the system can perform steps 206-210 sequentially for each of the chunks according to an arbitrarily determined chunk order.

The system then generates, for each training pair in the batch and using the respective image embeddings and the respective text embeddings for the plurality of chunks stored in the memory of the set of one or more computing devices, a respective similarity between the image embedding of the input image in the training pair and the respective text embeddings of the input text segments in all of the training pairs in the batch (step 212). For example, the system can compute, for each image embedding, dot products between the image embedding and all of the text embeddings for all of the input text segments in all of the training pairs in the batch.

The system then trains the image encoder, the text encoder, or both, using the generated similarities (step 214).

In some cases, the system trains only the image encoder during the contrastive learning phase. These cases are described below with reference to FIG. 3.

In some other cases, the system trains only the text encoder during the contrastive learning phase. These cases are described below with reference to FIG. 4.

Figure 3:
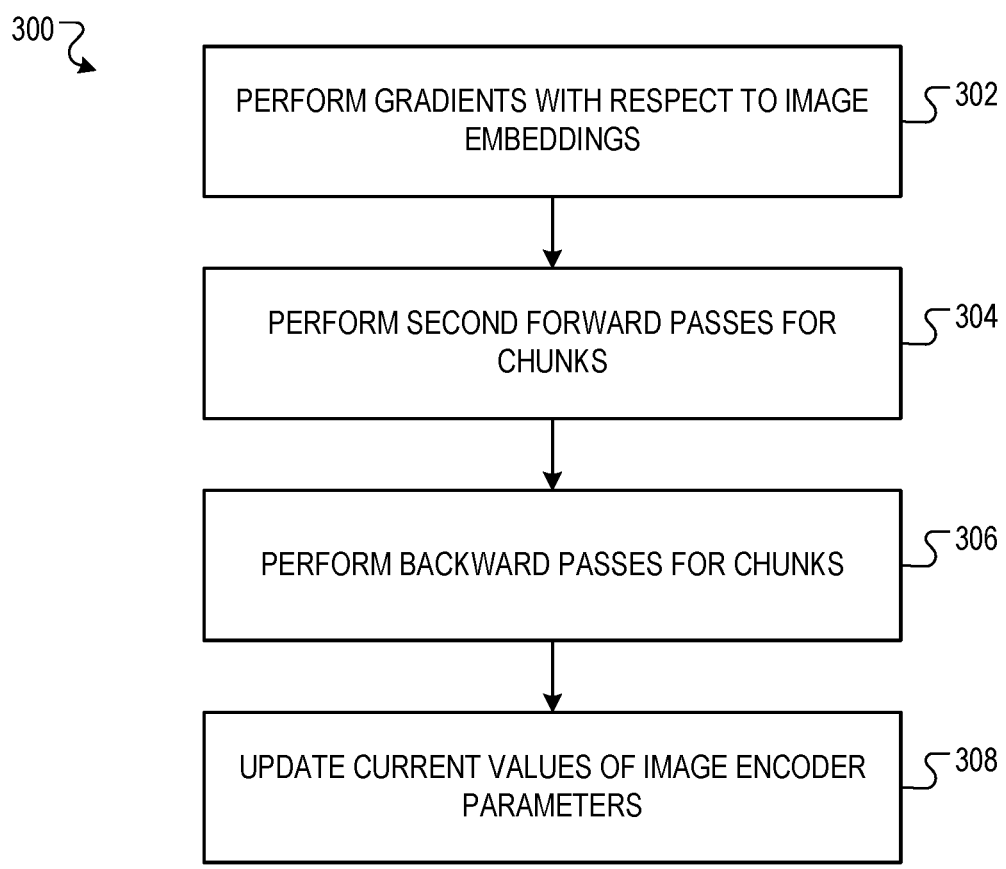
FIG. 3 is a flow diagram of an example process for updating the image encoder neural network.

FIG. 3 is a flow diagram of an example process 300 for updating the parameters of the image encoder using the generated similarities. For convenience, the process 300 will be described as being performed by a system of one or more computers located in one or more locations. For example, a neural network system, e.g., the neural network system 100 of FIG. 1, appropriately programmed, can perform the process 300.

The system determines, for each training pair in the batch, a respective gradient with respect to the image embedding of the input image in the training pair of a contrastive loss function that is based on the respective similarities (step 302). For example, the system can compute the respective gradients with respect to the image embeddings of the contrastive loss function described above with reference to FIG. 1.

To compute the gradients, the system can determine a respective gradient of the contrastive loss function with respect to each respective similarity between any two input image-input text segment pairs in the batch and then determine, using backpropagation, the respective gradients of the contrastive loss function with respect to the image embeddings for the input images in the training pairs in the batch from the respective gradients of the contrastive loss function with respect to the respective similarities and the image embeddings.

The system then performs steps 304 and 306 for each chunk.

The system then performs, on the one or more computing devices, a second forward pass through the image encoder neural network in accordance with current values of the image encoder neural network parameters on the input images in the training pairs in the chunk to re-generate the intermediate hidden states of the image encoder neural network (step 304). That is, because the intermediate hidden states are necessary to backpropagate the gradient through the image encoder, the system performs the second forward pass to re-generate these quantities.

The system then performs a backward pass through the image encoder neural network using the respective gradients with respect to the image embeddings of the input images in the training pairs in the chunk and the re-generated intermediate hidden states to generate a respective chunked gradient of the contrastive loss function with respect to each of the image encoder neural network (step 306).

Performing a "backward pass" refers to performing the operations necessary to perform backpropagation through a neural network, i.e., to compute a respective gradient of a loss function with respect to each of the parameters of a neural network given a gradient of the loss function with respect to the output of the neural network (in this case, the gradient with respect to the image embeddings).

The chunked gradient is referred to as a "chunked" gradient because it is a combination, e.g., an average or sum, of individual gradients with respect to only each pair in the chunk, i.e., as opposed to a batched gradient, which would be a combination of individual gradients with respect to each of the pairs in the entire batch.

Additionally, for each chunk, after performing a backward pass through the image encoder neural network using the respective gradients with respect to the image embeddings of the training pairs in the chunk and the re-generated intermediate hidden states, the system can discard the re-generated intermediate hidden states prior to performing a backward pass for any subsequent chunks. This ensures that the on-chip memory does not need to store intermediate hidden states for more than one chunk at any given time.

The system updates the current values of the image encoder neural network parameters using the respective chunked gradients for the chunks (step 308).

Generally, the system updates the current values by applying an optimizer to the current values of the image encoder neural network parameters using the respective chunked gradients to generate updated values for the image encoder neural network parameters. The optimizer can be any appropriate neural network training optimizer, e.g., Adam, Adafactor, rmsProp, and so on.

In some implementations, to apply the optimizer, the system combines the chunked gradients, e.g., averages or sums the chunked gradients, to generate a batch gradient and then applies an optimizer to the current values of the image encoder network parameters to generate updated values of the parameters.

However, to do this, because storing the respective chunked gradients for all of the chunks would be consume an excessive amount of on-chip memory, the system must allocate on-chip memory on the one or more devices for a cumulative gradient that needs to be stored as the system combines each chunked gradient. This cumulative gradient has as many entries as the total number of image encoder network parameters. That is, once a chunked gradient is computed, the system must accumulate the chunked gradient into the cumulative gradient and then discard the chunked gradient in order to avoid excessive memory consumption, i.e., must update the cumulative gradient in a "streaming" fashion. When the image encoder neural network is large, this can consume more memory than is available in on-chip memory. For example, because the on-chip memory already needs to store the values of all of the parameters in order to perform the forward and backward passes, also storing the cumulative gradient will require double the on-chip memory, which can be a significant fraction of the memory capacity when the model is large, e.g., has over 1 billion parameters.

To account for this, in some implementations, the system may apply the optimizer in a manner that does not require a separately stored cumulative gradient. This is described in more detail below with reference to FIG. 5.

In some other cases, the system trains only the text encoder during the contrastive learning phase.

Figure 4:
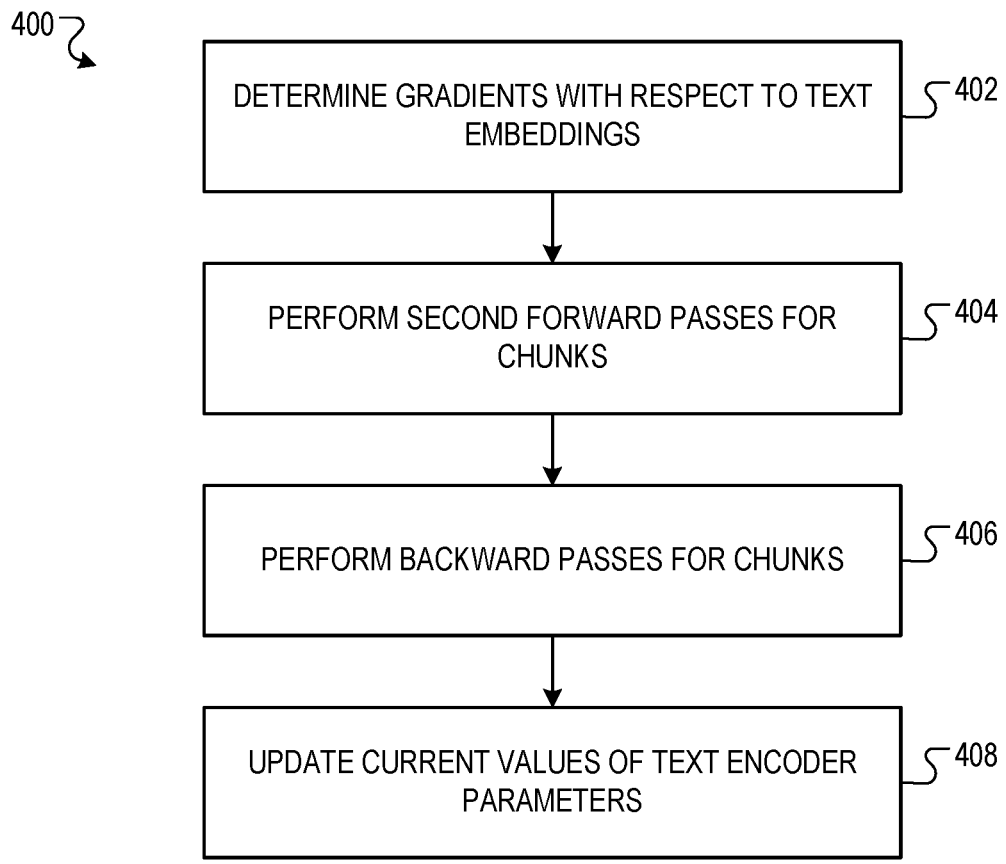
FIG. 4 is a flow diagram of an example process for updating the text encoder neural network.

FIG. 4 is a flow diagram of an example process 400 for updating the parameters of the text encoder using the generated similarities. For convenience, the process 400 will be described as being performed by a system of one or more computers located in one or more locations. For example, a neural network system, e.g., the neural network system 100 of FIG. 1, appropriately programmed, can perform the process 400.

The system determines, for each training pair in the batch, a respective gradient with respect to the text embedding of the input text segment in the training pair of the contrastive loss function (step 402).

The system then performs steps 404 and 406 for each chunk.

The system then performs, on the one or more computing devices, a second forward pass through the text encoder neural network in accordance with current values of the text encoder neural network parameters on the input images in the training pairs in the chunk to re-generate the intermediate hidden states of the text encoder neural network (step 404).

The system then performs a backward pass through the text encoder neural network using the respective gradients with respect to the text embeddings of the input images in the training pairs in the chunk and the re-generated intermediate hidden states to generate a respective chunked gradient of the contrastive loss function with respect to each of the text encoder neural network parameters (step 406).

Additionally, for each chunk, after performing a backward pass through the text encoder neural network using the respective gradients with respect to the text embeddings of the training pairs in the chunk and the re-generated intermediate hidden states, the system can discard the re-generated intermediate hidden states prior to performing the second forward pass and backward pass for any subsequent chunks. This ensures that the on-chip memory does not need to store intermediate hidden states for more than one chunk at any given time.

The system updates the current values of the text encoder neural network parameters using the respective chunked gradients for the chunks (step 408).

Generally, the system updates the current values by applying an optimizer to the current values of the text encoder neural network parameters using the respective chunked gradients to generate updated values for the text encoder neural network parameters. The optimizer can be any appropriate neural network training optimizer, e.g., Adam, Adafactor, rmsProp, and so on.

As described above for the image encoder, in some implementations, to apply the optimizer, the system combines the chunked gradients, e.g., averages or sums the chunked gradients, to generate a batch gradient and then applies an optimizer to the current values of the image encoder network parameters to generate updated values of the parameters.

In some other implementations, to avoid a memory bottleneck, the system applies the optimizer in a manner that does not require a cumulative gradient. This is described in more detail below with reference to FIG. 5.

In yet other cases, the system trains both the neural networks during the contrastive learning phase. In these cases, the system performs the second forward passes and backward passes through both the neural networks and updates the current values of the parameters of both neural networks as described above with reference to FIGS. 3 and 4.

When both neural networks are being trained, the system can perform the operations required to compute the chunked gradients for both neural networks for any given chunk before moving on to the next chunk.

In some implementations, the system can use different sized chunks for the processing of the image encoder neural network and the processing of the text encoder neural network. For example, this can enable the system to use larger chunks (and decrease training times) for the smaller neural network and smaller chunks for the larger neural network if the two neural networks are the same size.

When the set of computing devices includes multiple devices, the system can use data parallelism, so that each of the plurality computing devices performs the first forward passes and the second forwarded passes for a respective partition of the training pairs in the chunk. That is, when the set of computing devices includes R devices and each chunk includes M pairs, each of the R devices operates as a replica that computes per-device gradients for the M/R pairs assigned to the device by performing the required forward and backward passes for the M/R pairs assigned to the device. The system can then compute the chunked gradient from the per-device gradients by performing an all-reduce operation on the per-device gradients, i.e., an operation that averages the per-device gradients to generate the chunked gradient.

Figure 5:
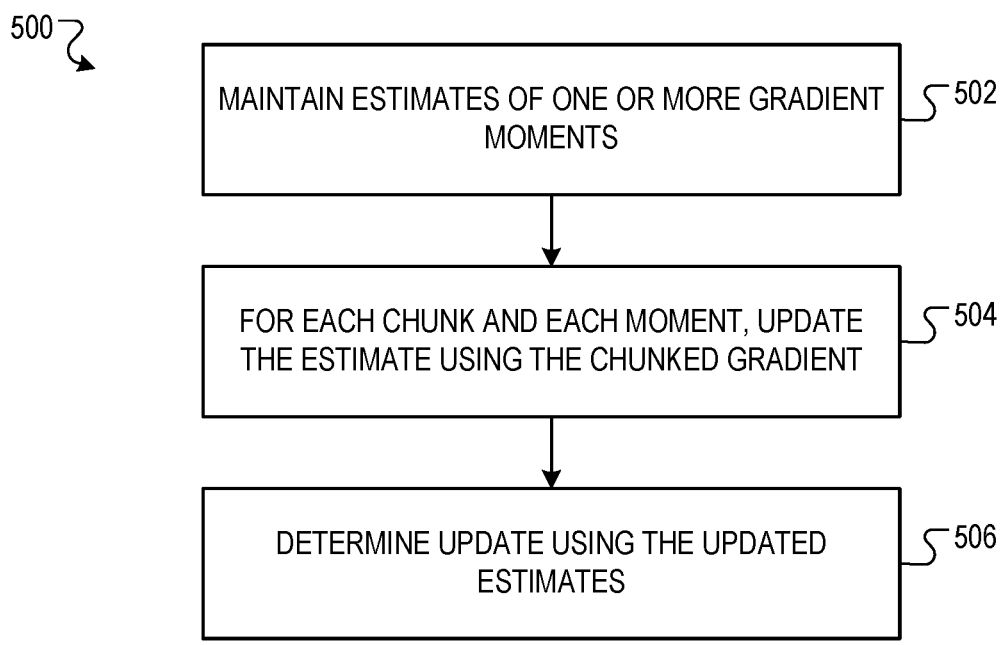
FIG. 5 is a flow diagram of an example process for applying an optimizer to chunked gradients.

FIG. 5 is a flow diagram of an example process 500 for applying an optimizer to chunked gradients. For convenience, the process 500 will be described as being performed by a system of one or more computers located in one or more locations. For example, a neural network system, e.g., the neural network system 100 of FIG. 1, appropriately programmed, can perform the process 500.

The system can perform the process 500 to apply an optimizer to the parameters of the image encoder, to the parameters of the text encoder, or both.

In particular, the system can perform the process 500 for any appropriate optimizer that maintains respective estimates of one or more gradient moments of the gradients of the parameters and determines an update to the current values of the image encoder neural network parameters using the respective estimates. For example, the optimizer can be the Adam or AdamW optimizers that maintain estimates of the first and second moments of the gradients.

As another example, the optimizer can be the Adafactor optimizer.

As yet another example, the optimizer can be the rmsProp optimizer.

That is, when the system uses one of these optimizers for the training, since the optimizer already allocates memory to store gradient moments, typically called slots, the system directly accumulates the chunk gradients into these slots. Thus, the system effectively accumulates the chunk gradients without needing to use additional memory to store the cumulative gradients.

In particular, the system maintains one or more respective estimates of one or more of the gradient moments of the gradients with respect to the network parameters (step 502). For example, for Adam, the system maintains respective estimates of the first and second moments of the gradients.

For each chunk, the system, updates, for each of the gradient moments, the respective estimate of the gradient moment using the respective chunked gradient for the chunk (step 504).

For any given chunk i, the system can update the respective estimate of the first gradient moment $v_1$ as follows:

$$v_1 \leftarrow k_1 v_1 + (1-\beta_1)c_i,$$

where $c_i$ is the chunked gradient for the chunk i, $\beta_1$ is the optimizer's exponential decay rate for the first gradient moment, and $k_1$ equals $\beta_1$ for the first chunk and $1/K$ for all subsequent chunks, where K is the total number of chunks.

That is, instead of updating the first moment estimate once using the batch gradient, the system updates the gradient moment K times, one for each chunk.

For any given chunk i, the system can update the respective estimate of the first gradient moment $v_1$ as follows:

$$v_1 \leftarrow k_1 v_1 + (1-\beta_1)c_i,$$

where $c_i$ is the chunked gradient for the chunk i, $\beta_1$ is the optimizer's exponential decay rate for the first gradient moment, and $k_1$ equals $\beta_1$ for the first chunk and 1/K for all subsequent chunks, where K is the total number of chunks.

For any given chunk i, the system can update the respective estimate of the second gradient moment $v_2$ as follows:

$$v_2 \leftarrow k_2 v_2 + (1-\beta_2)(c_i^2 - \text{Var}(c_i)),$$

where $c_i$ is the chunked gradient for the chunk i, $\beta_2$ is the optimizer's exponential decay rate for the second gradient moment, and $k_2$ equals $\beta_2$ for the first chunk and 1/K for all subsequent chunks, where K is the total number of chunks, and $\text{Var}(c_i)$ is an estimate of the variance of $c_i$. For example, when the system uses data parallelism with R devices that each compute per-device gradients for the MIR pairs assigned to the device and $c_i$ is computed as an all-reduce operation of the per-device gradients, the system can compute $\text{Var}(c_i) = \text{Var}[d]/R$, where $\text{Var}[d]$ is the variance of the per-device gradients used to compute $c_i$.

That is, instead of updating the second moment estimate once using the batch gradient, the system updates the second gradient moment K times, one for each chunk.

Thus, the system can update the respective estimates of the one or more gradient moments without allocating any additional on-chip memory.

For each chunk and after updating, for each of the gradient moments, the respective estimate of the gradient moment using the respective chunked gradient for the chunk, the system can discard the respective chunked gradient for the chunk, i.e., so that the chunked gradient is not stored in memory.

The system determines the update to the current values of the network parameters using the respective estimates of each of the gradient moments after the respective estimates have been updated using the respective chunked gradients for all of the chunks (step 506). Generally, the system determines the update using the update rule for the optimizer. For example, for the Adam optimizer, an example update rule for parameters θ is as follows:

$$\hat{v}_1 \leftarrow \frac{v_1}{1 - \beta_1^t}$$

$$\hat{v}_2 \leftarrow \frac{v_2}{1 - \beta_2^t}$$

$$\theta \leftarrow \theta - \alpha \hat{v}_1 / (\sqrt{\hat{v}_2} + \epsilon),$$

where t is an index for the current training step, α is a learning rate constant, and ε is a numerical stability constant. Thus, neither the update of the parameters nor the update to the gradient moment estimate(s) requires the system to store a cumulative gradient as chunked gradients stream in.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers and for training an image encoder neural network having image encoder neural network parameters and configured to process an image to generate an image embedding of the image in an embedding space and a text encoder neural network having text encoder neural network parameters and configured to process a text segment to generate a text embedding of the text segment in the embedding space, the method comprising:
obtaining a batch of training pairs, each training pair including an input image and an input text segment;
obtaining data partitioning the batch of training pairs into a plurality of chunks of training pairs;
for each chunk:
performing, on a set of one or more computing devices, a first forward pass through the image encoder neural network in accordance with current values of the image encoder neural network parameters on the input images in the training pairs in the chunk to generate a respective image embedding of each input image;
performing, on the set of one or more computing devices, a first forward pass through the text encoder neural network in accordance with current values of the text encoder neural network parameters on the input text segments in the training pairs in the chunk to generate a respective text embedding of each text segment;
storing, in memory of the set of one or more computing devices, the respective image embeddings and the respective text embeddings without storing intermediate hidden states generated by performing the first forward passes through the image encoder neural network and the text encoder neural network;
for each training pair in the batch and using the respective image embeddings and the respective text embeddings for the plurality of chunks stored in the memory of the set of one or more computing devices, generating a respective similarity between the image embedding of the input image in the training pair and the respective text embeddings of the input text segments in all of the training pairs in the batch;
determining, for each training pair in the batch, a respective gradient with respect to the image embedding of the input image in the training pair of a contrastive loss function that is based on the respective similarities;
for each chunk:
performing, on the one or more computing devices, a second forward pass through the image encoder neural network in accordance with current values of the image encoder neural network parameters on the input images in the training pairs in the chunk to re-generate the intermediate hidden states of the image encoder neural network;
performing a backward pass through the image encoder neural network using the respective gradients with respect to the image embeddings of the input images in the training pairs in the chunk and the re-generated intermediate hidden states to generate a respective chunked gradient of the contrastive loss function with respect to each of the image encoder neural network parameters; and
updating the current values of the image encoder neural network parameters using the respective chunked gradients for the chunks.

2. The method of claim 1, further comprising:
determining, for each training pair in the batch, a respective gradient with respect to the text embedding of the input text segment in the training pair of the contrastive loss function that is based on the respective similarities;
for each chunk:
performing, on the one or more computing devices, a second forward pass through the text encoder neural network in accordance with current values of the text encoder neural network parameters on the input text segments in the training pairs in the chunk to re-generate the intermediate hidden states of the text encoder neural network; and
performing a backward pass through the text encoder neural network using the respective gradients with respect to the text embeddings for the text segments in the training pairs in the chunk and the re-generated intermediate hidden states of the text encoder neural network to generate a respective chunked gradient of the contrastive loss function with respect to each of the text encoder neural network parameters; and
updating the current values of the text encoder neural network parameters using the respective chunked gradients for the chunks.

3. The method of claim 1, wherein updating the current values of the image encoder neural network parameters using the respective chunked gradients for the chunks comprises:
applying an optimizer to the current values of the image encoder neural network parameters using the respective chunked gradients.

4. The method of claim 3, wherein the optimizer maintains respective estimates of one or more gradient moments and determines an update to the current values of the image encoder neural network parameters using the respective estimates, and wherein applying the optimizer comprises:
for each chunk and for each of the gradient moments, updating the respective estimate of the gradient moment using the respective chunked gradient for the chunk; and
determining the update using the respective estimates of each of the gradient moments after the respective estimates have been updated using the respective chunked gradients for all of the chunks.

5. The method of claim 4, further comprising, for each chunk and after updating, for each of the gradient moments, the respective estimate of the gradient moment using the respective chunked gradient for the chunk, discarding the respective chunked gradient for the chunk.

6. The method of claim 1, further comprising:
for each chunk, after performing a backward pass through the image encoder neural network using the respective gradients with respect to the image embeddings of the training pairs in the chunk and the re-generated intermediate hidden states, discarding the re-generated intermediate hidden states prior to performing a backward pass for any subsequent chunks.

7. The method of claim 1, wherein generating a respective similarity between the image embedding of the input image in the training pair and the respective text embeddings of the input text segments in all of the training pairs in the batch comprises, for each particular training pair in the batch:
computing a dot product between the image embedding of the input image in the training pair and the text embedding of the text embedding of the input text segment in the particular training pair.

8. The method of claim 1, wherein determining, for each training pair in the batch, a respective gradient of a contrastive loss function that is based on the respective similarities with respect to the image embedding of the input image in the training pair comprises:
   determining a respective gradient of the contrastive loss function with respect to each respective similarity between any two input image-input text segment pairs in the batch; and
   determining the respective gradients of the contrastive loss function with respect to the image embeddings for the input images in the training pairs in the batch from the respective gradients of the contrastive loss function with respect to the respective similarities and the image embeddings.

9. The method of claim 1, further comprising:
   prior to jointly training the image encoder neural network and the text encoder neural network, training an image classification model that includes the image encoder neural network on an image classification task, wherein the current values of the image encoder neural network parameters are determined based on values of the parameters after training the image classification model.

10. The method of claim 1, further comprising:
    after training the image encoder neural network and the text encoder neural network, using the trained image encoder neural network and the trained text encoder neural network to perform a downstream task.

11. The method of claim 10, wherein the downstream task is image classification.

12. The method of claim 1, wherein the set includes a plurality of computing devices and wherein, for each chunk, each of the plurality computing devices performs the first forward passes for a respective partition of the training pairs in the chunk.

13. The method of claim 1, wherein an amount of memory required to perform a forward pass on the batch of training input pairs exceeds an amount of available memory in the memory of the set of one or more computing devices, and wherein an amount of memory required to perform the first forward pass for each chunk does not exceed the amount of available memory.

14. A system comprising one or more computers and one or more storage devices storing instructions that when executed by the one or more computers cause the one more computers to perform operations for training an image encoder neural network having image encoder neural network parameters and configured to process an image to generate an image embedding of the image in an embedding space and a text encoder neural network having text encoder neural network parameters and configured to process a text segment to generate a text embedding of the text segment in the embedding space, the operations comprising:
   obtaining a batch of training pairs, each training pair including an input image and an input text segment;
   obtaining data partitioning the batch of training pairs into a plurality of chunks of training pairs;
   for each chunk:
      performing, on a set of one or more computing devices, a first forward pass through the image encoder neural network in accordance with current values of the image encoder neural network parameters on the input images in the training pairs in the chunk to generate a respective image embedding of each input image;
      performing, on the set of one or more computing devices, a first forward pass through the text encoder neural network in accordance with current values of the text encoder neural network parameters on the input text segments in the training pairs in the chunk to generate a respective text embedding of each text segment;
      storing, in memory of the set of one or more computing devices, the respective image embeddings and the respective text embeddings without storing intermediate hidden states generated by performing the first forward passes through the image encoder neural network and the text encoder neural network;
   for each training pair in the batch and using the respective image embeddings and the respective text embeddings for the plurality of chunks stored in the memory of the set of one or more computing devices, generating a respective similarity between the image embedding of the input image in the training pair and the respective text embeddings of the input text segments in all of the training pairs in the batch;
   determining, for each training pair in the batch, a respective gradient with respect to the image embedding of the input image in the training pair of a contrastive loss function that is based on the respective similarities;
   for each chunk:
      performing, on the one or more computing devices, a second forward pass through the image encoder neural network in accordance with current values of the image encoder neural network parameters on the input images in the training pairs in the chunk to re-generate the intermediate hidden states of the image encoder neural network;
      performing a backward pass through the image encoder neural network using the respective gradients with respect to the image embeddings of the input images in the training pairs in the chunk and the re-generated intermediate hidden states to generate a respective chunked gradient of the contrastive loss function with respect to each of the image encoder neural network parameters; and
   updating the current values of the image encoder neural network parameters using the respective chunked gradients for the chunks.

15. The system of claim 14, the operations further comprising:
   determining, for each training pair in the batch, a respective gradient with respect to the text embedding of the input text segment in the training pair of the contrastive loss function that is based on the respective similarities;
   for each chunk:
      performing, on the one or more computing devices, a second forward pass through the text encoder neural network in accordance with current values of the text encoder neural network parameters on the input text segments in the training pairs in the chunk to re-generate the intermediate hidden states of the text encoder neural network; and
      performing a backward pass through the text encoder neural network using the respective gradients with respect to the text embeddings for the text segments in the training pairs in the chunk and the re-generated intermediate hidden states of the text encoder neural network to generate a respective chunked gradient of the contrastive loss function with respect to each of the text encoder neural network parameters; and updating the current values of the text encoder neural network parameters using the respective chunked gradients for the chunks.

16. The system of claim 14, wherein updating the current values of the image encoder neural network parameters using the respective chunked gradients for the chunks comprises:
applying an optimizer to the current values of the image encoder neural network parameters using the respective chunked gradients.

17. The system of claim 16, wherein the optimizer maintains respective estimates of one or more gradient moments and determines an update to the current values of the image encoder neural network parameters using the respective estimates, and wherein applying the optimizer comprises:
for each chunk and for each of the gradient moments, updating the respective estimate of the gradient moment using the respective chunked gradient for the chunk; and
determining the update using the respective estimates of each of the gradient moments after the respective estimates have been updated using the respective chunked gradients for all of the chunks.

18. The system of claim 17, further comprising, for each chunk and after updating, for each of the gradient moments, the respective estimate of the gradient moment using the respective chunked gradient for the chunk, discarding the respective chunked gradient for the chunk.

19. The system of claim 14, the operations further comprising:
for each chunk, after performing a backward pass through the image encoder neural network using the respective gradients with respect to the image embeddings of the training pairs in the chunk and the re-generated intermediate hidden states, discarding the re-generated intermediate hidden states prior to performing a backward pass for any subsequent chunks.

20. One or more non-transitory computer-readable storage media storing instructions that when executed by one or more computers cause the one more computers to perform operations for training an image encoder neural network having image encoder neural network parameters and configured to process an image to generate an image embedding of the image in an embedding space and a text encoder neural network having text encoder neural network parameters and configured to process a text segment to generate a text embedding of the text segment in the embedding space, the operations comprising:
obtaining a batch of training pairs, each training pair including an input image and an input text segment;
obtaining data partitioning the batch of training pairs into a plurality of chunks of training pairs;
for each chunk:
performing, on a set of one or more computing devices, a first forward pass through the image encoder neural network in accordance with current values of the image encoder neural network parameters on the input images in the training pairs in the chunk to generate a respective image embedding of each input image;
performing, on the set of one or more computing devices, a first forward pass through the text encoder neural network in accordance with current values of the text encoder neural network parameters on the input text segments in the training pairs in the chunk to generate a respective text embedding of each text segment;
storing, in memory of the set of one or more computing devices, the respective image embeddings and the respective text embeddings without storing intermediate hidden states generated by performing the first forward passes through the image encoder neural network and the text encoder neural network;
for each training pair in the batch and using the respective image embeddings and the respective text embeddings for the plurality of chunks stored in the memory of the set of one or more computing devices, generating a respective similarity between the image embedding of the input image in the training pair and the respective text embeddings of the input text segments in all of the training pairs in the batch;
determining, for each training pair in the batch, a respective gradient with respect to the image embedding of the input image in the training pair of a contrastive loss function that is based on the respective similarities;
for each chunk:
performing, on the one or more computing devices, a second forward pass through the image encoder neural network in accordance with current values of the image encoder neural network parameters on the input images in the training pairs in the chunk to re-generate the intermediate hidden states of the image encoder neural network;
performing a backward pass through the image encoder neural network using the respective gradients with respect to the image embeddings of the input images in the training pairs in the chunk and the re-generated intermediate hidden states to generate a respective chunked gradient of the contrastive loss function with respect to each of the image encoder neural network parameters; and
updating the current values of the image encoder neural network parameters using the respective chunked gradients for the chunks.

* * * * *